(12) United States Patent
Sharma et al.

(10) Patent No.: US 10,750,355 B2
(45) Date of Patent: Aug. 18, 2020

(54) METHOD AND SYSTEM FOR MANAGING SESSION ACROSS MULTIPLE ELECTRONIC DEVICES IN NETWORK SYSTEM

(71) Applicant: Samsung Electronics Co., Ltd., Suwon-si, Gyeonggi-do (KR)

(72) Inventors: Diwakar Sharma, Bangalore (IN); Anshuman Nigam, Bangalore (IN); Mangesh Ingale, Bangalore (IN); Rajavelsamy Rajadurai, Bangalore (IN); Tushar Vrind, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/087,170

(22) PCT Filed: Mar. 22, 2017

(86) PCT No.: PCT/KR2017/003078
§ 371 (c)(1),
(2) Date: Sep. 21, 2018

(87) PCT Pub. No.: WO2017/164643
PCT Pub. Date: Sep. 28, 2017

(65) Prior Publication Data
US 2019/0104403 A1      Apr. 4, 2019

(30) Foreign Application Priority Data

Mar. 23, 2016 (IN) .............................. 201641010245
Mar. 13, 2017 (IN) .............................. 201641010245

(51) Int. Cl.
*H04W 8/20* (2009.01)
*H04W 76/28* (2018.01)
(Continued)

(52) U.S. Cl.
CPC ........... *H04W 8/205* (2013.01); *H04L 67/148* (2013.01); *H04W 36/0033* (2013.01);
(Continued)

(58) Field of Classification Search
None
See application file for complete search history.

(56) References Cited

U.S. PATENT DOCUMENTS

| 8,131,860 | B1 * | 3/2012 | Wong .................. G06F 11/2097 370/338 |
| 8,503,340 | B1 * | 8/2013 | Xu ........................ H04W 84/12 370/310 |

(Continued)

FOREIGN PATENT DOCUMENTS

WO      WO-2014077900 A1      5/2014

OTHER PUBLICATIONS

3GPP, "Technical Specification, ETSI TS 129 280 v12.2.0" Oct. 2014, ETSI, 25 pages.*

(Continued)

*Primary Examiner* — Bunjob Jaroenchonwanit
(74) *Attorney, Agent, or Firm* — Harness, Dickey & Pierce, P.L.C.

(57) ABSTRACT

Embodiments herein provide a method and system for managing session across multiple electronic devices in a network system. The method includes receiving by a target electronic device a first message from a source electronic device which includes a request to transfer context associated with at least one ongoing session on the source electronic device. Further, the method includes sending a response message to the source electronic device which includes a confirmation for the context transfer to. Further, the method includes receiving a Carry Your Own Context (CYOC) container associated with the at least one ongoing
(Continued)

session from the source electronic device, wherein the CYOC container consists of cellular parameter information required for seamless session transfer from the source electronic device to the target electronic device. Furthermore, the method includes completing the at least one session transfer using the cellular parameter information received in the CYOC container.

20 Claims, 12 Drawing Sheets

(51) Int. Cl.
| | | |
|---|---|---|
| *H04W 76/27* | (2018.01) | |
| *H04L 29/08* | (2006.01) | |
| *H04W 36/00* | (2009.01) | |
| *H04W 80/10* | (2009.01) | |
| *H04W 76/20* | (2018.01) | |
| *H04W 80/02* | (2009.01) | |

(52) U.S. Cl.
CPC ........... *H04W 76/27* (2018.02); *H04W 76/28* (2018.02); *H04W 76/20* (2018.02); *H04W 80/02* (2013.01); *H04W 80/10* (2013.01)

(56) References Cited

U.S. PATENT DOCUMENTS

| | | | | |
|---|---|---|---|---|
| 9,155,020 | B1* | 10/2015 | Graffagnino | H04W 40/12 |
| 2004/0023652 | A1* | 2/2004 | Shah | H04W 48/18 |
| | | | | 455/426.2 |
| 2005/0232212 | A1* | 10/2005 | Kang | H04W 36/0061 |
| | | | | 370/338 |
| 2009/0258641 | A1* | 10/2009 | Yaqub | H04W 52/0251 |
| | | | | 455/426.1 |
| 2009/0323635 | A1* | 12/2009 | Gras | H04W 36/0011 |
| | | | | 370/331 |
| 2011/0211444 | A1* | 9/2011 | Das | H04W 36/18 |
| | | | | 370/219 |
| 2011/0258327 | A1* | 10/2011 | Phan | H04W 76/14 |
| | | | | 709/227 |
| 2012/0084364 | A1* | 4/2012 | Sivavakeesar | H04L 12/1818 |
| | | | | 709/205 |
| 2013/0287006 | A1* | 10/2013 | Nix | H04L 29/125 |
| | | | | 370/331 |
| 2014/0038590 | A1* | 2/2014 | Wijting | H04W 76/14 |
| | | | | 455/426.1 |
| 2014/0179330 | A1* | 6/2014 | Du | H04W 74/0833 |
| | | | | 455/450 |
| 2014/0235234 | A1* | 8/2014 | Jang | H04W 36/18 |
| | | | | 455/426.1 |
| 2014/0243040 | A1* | 8/2014 | Bienas | H04W 76/23 |
| | | | | 455/552.1 |
| 2014/0247711 | A1* | 9/2014 | Gantman | H04W 88/06 |
| | | | | 370/221 |
| 2014/0314049 | A1* | 10/2014 | Cho | H04L 5/006 |
| | | | | 370/332 |
| 2015/0042750 | A1* | 2/2015 | Vivekanandan | H04M 3/567 |
| | | | | 348/14.08 |
| 2015/0172905 | A1 | 6/2015 | Qi et al. | |
| 2015/0245394 | A1 | 8/2015 | Sharma | |
| 2016/0112464 | A1* | 4/2016 | Nyshadham | H04L 65/1083 |
| | | | | 709/227 |
| 2016/0302119 | A1* | 10/2016 | Chen | H04W 56/002 |
| 2017/0127219 | A1* | 5/2017 | Schmidt | H04W 4/90 |
| 2018/0206286 | A1* | 7/2018 | Pragada | H04W 76/25 |
| 2018/0262962 | A1* | 9/2018 | Ta | H04W 36/14 |
| 2018/0359664 | A1* | 12/2018 | Kim | H04W 36/0079 |

OTHER PUBLICATIONS

International Search Report PCT/ISA210 for International Application No. PCT/KR2017/003078, dated Jun. 21, 2017.
Written Opinion of the International Searching Authority PCT/ISA237 for International Application No. PCT/KR2017/003078 dated Jun. 21, 2017.
3GPP TSG Services and System Aspects; Feasibility Study on New Services and Markets Technology Enablers for Massive Internet of Things; Stage 1 (Release 14) V1.0.0, Feb. 2016, Valbonne, France.
L. Milatano. et. al. "Device-to-Device Communications for 5G Internet of Things" vol. 1, Issue 1,e4, Oct. 26, 2015. Uploaded Mar. 2, 2016. Mediterranea University of Reggio, Calabria, Italy.

* cited by examiner

METHOD AND SYSTEM FOR MANAGING SESSION ACROSS MULTIPLE ELECTRONIC DEVICES IN NETWORK SYSTEM

CROSS-REFERENCE TO RELATED APPLICATIONS

This application is a National Phase Entry of PCT International Application No. PCT/KR2017/003078, which was filed on Mar. 22, 2017, and claims priority to Indian Provisional Patent Application No. 201641010245, which was filed on Mar. 23, 2016, and Indian Complete Patent Application No. 201641010245, which was filed on Mar. 13, 2017, the contents of which are incorporated herein by reference.

TECHNICAL FIELD

The present disclosure relates to method and system for managing session across multiple electronic devices in network system.

BACKGROUND ART

In general, when a user of the electronic device desires to switch to another electronic device then the user can effortlessly transfer the contents of the electronic device to another electronic by using any of the existing methods. Alternatively, the user can also access his/her cloud storage server (or any other storage medium where the backup of the content is stored) from another electronic device and perform the restore procedure.

Further, a Subscriber Identification Module (SIM) card/UICC of the electronic device has to be physically transferred; by removing the UICC from the electronic device and inserting into another electronic device. In existing scenarios, where the user of the electronic device is associated with another electronic device such as (wearable devices, another electronic device, smart TV's, etc.) it is very imperative to the user to seamless switch from the electronic device to another electronic device effortlessly.

Further, if the user of the electronic device wants to switch to another electronic with the active network sessions and contents, then the contents need to be on the cloud storage which the user can access from another electronic device and restore the contents thereof. The electronic device needs to be connected to the internet at all times. However, there exists no mechanism by which the electronic device can handover all the network sessions to another electronic device and the ability to have multiple devices be online simultaneously on a cellular network on needy basis.

DISCLOSURE OF INVENTION

Technical Problem

The principal object of the embodiments herein is to provide a method and system for managing at least one session across multiple electronic devices in a network system.

Another object of the embodiments herein is to provide a method for receiving by a target electronic device a first message including a request to transfer context associated with at least one ongoing session on a source electronic device.

Another object of the embodiments herein is to provide a method for sending by the target electronic device a response message which includes a confirmation for the context transfer to the source electronic device.

Another object of the embodiments herein is to provide a method for receiving by the target electronic device a Carry Your Own Context (CYOC) container associated the at least one ongoing session on the source electronic device, wherein the CYOC container consists of cellular parameter information required for seamless session transfer from the source device to the target device.

Another object of the embodiments herein is to provide a method for completing the at least one session transfer at the target device using the cellular parameters received in the CYOC container.

Yet another object of the embodiments herein is to provide a method for allowing the target electronic device to receive the CYOC container in an offline state.

Yet another object of the embodiments herein is to provide a method for sending by a source electronic device a first message including a request to transfer context associated with at least one ongoing session to a target electronic device.

Yet another object of the embodiments herein is to provide a method for receiving by the source electronic device a response which includes a confirmation for the context transfer from the target electronic device.

Yet another object of the embodiments herein is to provide a method for generating by the source electronic device Carry Your Own Context (CYOC) container associated with the at least one ongoing session on the source electronic device, wherein the CYOC container consists of cellular parameter information required for seamless session transfer from the source device to the target device.

Yet another object of the embodiments herein is to provide a method for transmitting by the source electronic device the CYOC container to the target electronic device.

Yet another object of the embodiments herein is to provide a method for allowing the source electronic device to send the CYOC container to the target electronic device, when the target electronic device is in an offline state.

Solution to Problem

Accordingly embodiments herein provide a method for managing at least one session across multiple electronic devices in a network system. The method includes: receiving by a target electronic device a first message from the source electronic device which includes a request to transfer context associated with at least one ongoing session on the source electronic device, sending by the target electronic device a response message which includes a confirmation for the context transfer to the source electronic device, receiving by the target electronic device a Carry Your Own Context (CYOC) container associated with the at least one ongoing session from the source electronic device, wherein the CYOC container consists of cellular parameter information required for seamless session transfer from the source electronic device to the target electronic device, and completing the at least one session transfer using the cellular parameters received in the CYOC container.

In an embodiment, method further includes continuing by the target electronic device one of a system acquisition and idle mode procedure, and sending a CYOC container confirmation message to the source electronic device.

In an embodiment, the method further includes performing by the target electronic device implicit handover, and sending a CYOC container confirmation message to the source electronic device.

In an embodiment, the method further includes resuming by the target electronic device one of uplink transmission and downlink transmission, sending a CYOC container confirmation message to the source electronic device, and triggering by the target electronic device a radio bearer reconfiguration procedure.

In an embodiment, the method further includes triggering a Radio Resource Control (RRC) connection release procedure, establishing a RRC connection with the network system, and sending a CYOC container confirmation message to the source electronic device.

In an embodiment, the method further includes triggering a RRC connection reestablishment procedure with the network system, and sending a CYOC container confirmation message to the source electronic device.

In an embodiment, the cellular parameter information includes information related to at least one session specific information viz., at least one out-of-coverage session information, at least one idle session information, and at least one connected session information.

In an embodiment, the one or more session specific information comprises at least one of packet data convergence protocol (PDCP) information, cell information, security keys information, Non-access stratum (NAS) information, Radio Link Control (RLC) information, RRC information, Medium Access Control (MAC) information, Transmission Control Protocol (TCP) information, and IP Multimedia Subsystem (IMS) information.

In an embodiment, at least one out-of-coverage session Information includes cell search and camping related status for each supported Radio Access Technology (RAT), a list of frequencies already searched, detected cells for each of the frequency, registration status for each of the cell and PLMNs, a barred list for each frequency, information of at least one of a physical layer, a RRC layer, a MAC layer, a RLC layer, a PDCP layer, and a NAS layer which includes all the required information in the source electronic device if the source electronic device were to restart scanning after a deep sleep operation.

In an embodiment, at least one idle session information comprises registration information, security keys and related NAS entities for active RAT, measurement database for several supported RATs, cell specific database, frequency database, barred list, allowed list, information of at least one of a physical layer, a RRC layer, a MAC layer, a RLC layer, a PDCP layer, and a NAS layer which includes all the required information in the source device if the source electronic device were to wake up from a DRX (discontinuous reception) sleep operation and resume 3GPP related procedures at one of physical layer, RRC layer, MAC layer, RLC layer, PDCP layer, and NAS layer.

In an embodiment, at least one connected session information comprises physical channel information, transport channel information, logical channel related configuration, states and sub-state related variables required for data at least one session, session initiation protocol (SIP) signaling information, information about at least one active VOLTE session on the source electronic device, and information about at least one active IMS session on the source electronic device, information of at least one of a physical layer, a RRC layer, a MAC layer, a RLC layer, a PDCP layer, and a NAS layer which includes all the required information in the source device if the source electronic device were to wake up from a connected DRX sleep operation and resume 3GPP related procedures at one of a physical Layer, RRC layer, MAC layer, RLC layer, PDCP layer, and NAS layer.

In an embodiment, wherein the first message can be transferred from the source electronic device to the target electronic device in one of deep sleep, DRX, connected DRX period respectively in out of coverage, idle and connected scenarios.

In an embodiment, the source electronic device and the target electronic device is subscribed same Universal Integrated Circuit Card (UICC) (i.e., Subscriber identity Module (SIM)).

In an embodiment, the target electronic device is in an offline state.

Accordingly embodiments herein provide a method for managing at least one session across multiple electronic devices in a network system. The method includes: sending by a source electronic device a first message including a request to transfer context associated with at least one ongoing session to a target electronic device, receiving by the source electronic device a response message which includes a confirmation for the context transfer from the target electronic device, generating by the source electronic device Carry Your Own Context (CYOC) container associated with the at least one ongoing session on the source electronic device, wherein the CYOC container consists of cellular parameter information required for seamless session transfer from the source device to the target device, and transmitting by the source electronic device the CYOC container to the target electronic device.

Accordingly embodiments herein provide a target electronic device for managing at least one session across multiple electronic devices in a network system. The target device includes a memory, a processor coupled to the memory, and a session manager coupled to the processor and configured to: receive a first message including a request to transfer context associated with at least one ongoing session on a source electronic device, send a response message which includes a confirmation for the context transfer to the source electronic device, receive a Carry Your Own Context (CYOC) container associated with the at least one ongoing session on the source electronic device, wherein the CYOC container consists of cellular parameter information required for seamless session transfer from the source device to the target device, and complete the at least one session transfer using the cellular parameters received in the CYOC container.

Accordingly embodiments herein provide a source electronic device for managing at least one session across multiple electronic devices in a network system. The source device includes a memory, a processor coupled to the memory, and a session manager coupled to the processor and configured to: send a first message including a request to transfer context associated with at least one ongoing session to a target electronic device, receive a response message which includes a confirmation for the context transfer from the target electronic device, generate Carry Your Own Context (CYOC) container associated with the at least one ongoing session on the source electronic device, wherein the CYOC container consists of cellular parameter information required for seamless session transfer from the source device to the target device, and transmit the CYOC container to the target electronic device.

Accordingly embodiments herein provide a system for managing at least one session across multiple electronic devices in a network system. The system includes a source electronic device configured to include a plurality of sessions, wherein the source electronic device comprising a session manager configured to: generate Carry Your Own Context (CYOC) container associated with the at least one session from the plurality of sessions, and transmit the CYOC container associated with the at least one session over the network system. Further, the system includes a target electronic device comprising a session manager configured to: receive the CYOC container associated with the at least one session from the plurality of sessions, and complete the at least one session transfer using the cellular parameters received in the CYOC container.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF DRAWINGS

This method is illustrated in the accompanying drawings, throughout which like reference letters indicate corresponding parts in the various figures. The embodiments herein will be better understood from the following description with reference to the drawings, in which.

MODE FOR THE INVENTION

Figure 1:
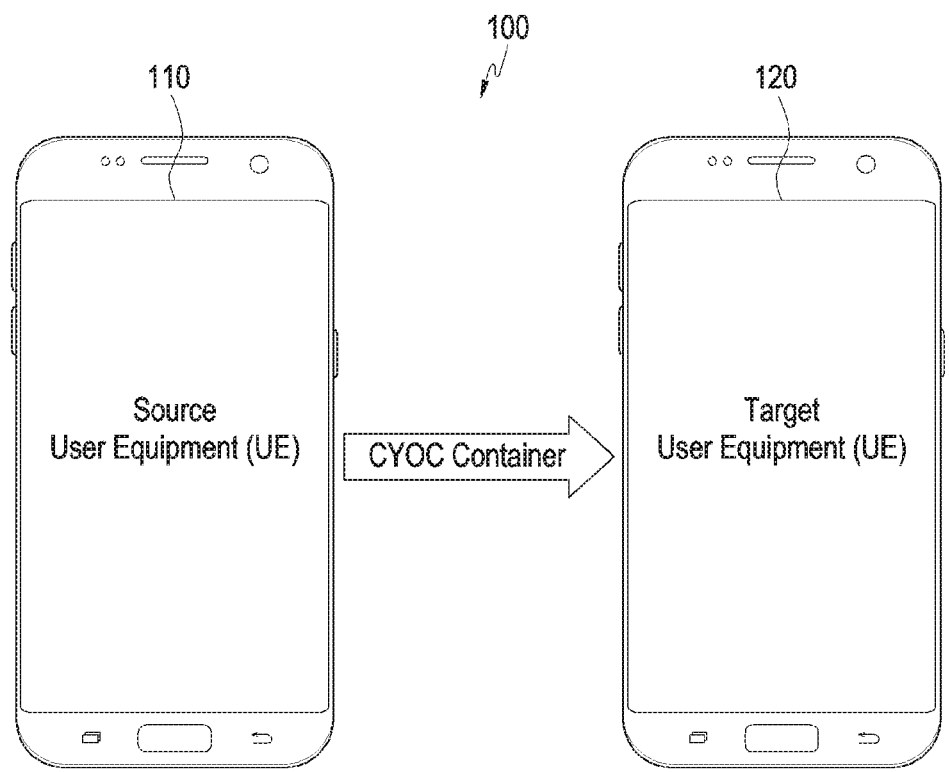
FIG. 1 illustrates a system for managing sessions between a source electronic device and a target electronic device, according to an embodiment as disclosed herein.

Various embodiments of the present disclosure will now be described in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

Also, the various embodiments described herein are not necessarily mutually exclusive, as some embodiments can be combined with one or more other embodiments to form new embodiments. Herein, the term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Throughout the description, the terms User Equipment" and/or the electronic device and/or device are used "interchangeably. Further, the terms "at least one" and/or "one or more" are used interchangeably.

Throughout the description, the terms "first message" and "a device context transfer request message" are used "interchangeably.

Prior to describing the embodiments in detail, it is useful to provide definitions for key terms used herein. Unless defined otherwise, all technical terms used herein have the same meaning as commonly understood by a person having ordinary skill in the art to which this invention belongs.

Carry Your Own Context (CYOC) container: the CYOC container includes one or more parameters (i.e., session information) required to establish a session with a network. The term CYOC container is coined to describe the user scenario of 3GPP sessions being carried by the end user. From the perspective of the end user, the context is current location of the user, so any ongoing session associated with source device, should be carried away to a target device if the user decides to change from the source device to the target device. The CYOC container defines the session information in each of the states of the UE viz idle, connected or out-of-service.

Implicit Handover: Transfer of session from source UE to a Target UE, without explicit message exchanges with the network.

Target UE: The UE to which the session has to be transferred.

Source UE: The UE from which the session transfer is initiated.

Offline State of the UE: A state in the UE, when it is not allowed to camp to any operator network, with short range communication link active (enabled) to communicate with other UEs in vicinity.

Connected State of the UE: A state of the UE, when it is registered to the operator network, and has active bearers for data transfer with the eNB, and carries out mobility and handover related procedures as controlled by the eNB.

Idle State of the UE: A state in the UE, when it is registered to the operator network, and periodically operates discontinuous reception (DRX) operation for power saving and maintains selection/reselection to the best possible cell in best possible PLMN The following documents and standards descriptions are hereby incorporated into the present disclosure as if fully set forth herein: 3GPP TR 22.861 V14.1.0 (2016-09), Feasibility Study on New Services and Markets Technology Enablers for Massive Internet of Things; Stage 1, (Release 14). Sections 5.1.2.5, and 5.1.2.6.

Accordingly embodiments herein provide a method for managing at least one session across multiple electronic devices in a network system. The method includes: receiving by a target electronic device a first message including a request to transfer context associated with at least one ongoing session on a source electronic device, sending by the target electronic device a response message which includes the confirmation for the context transfer to the source electronic device, receiving by the target electronic device a Carry Your Own Context (CYOC) container associated with the at least one ongoing session on the source electronic device, wherein the CYOC container consists of cellular parameter information required for seamless session transfer from the source device to the target device, and completing the at least one session transfer at the target device using the cellular parameter information received in the CYOC container.

Unlike the conventional mechanism, where once the UE is powered ON/enters in to out-of-coverage session, the UE may perform a cell search procedure to camp on to the nearest cell (e.g., serving cell) provided by a network (associated with UICC/SIM) of the UE. The cell search procedure includes scanning of the frequency to which the UE has to camp on. Thus, the UE may perform a blind search of the cell to which it has to be camped, consuming imperative resources (i.e., battery power, time, etc.) of the UE causing inconvenience to the user, more particularly in an emergency scenarios (e.g., low battery power, dis-continuity in the session, etc.).

The proposed method allows the UE to receive/send the session parameters from/to another UE. Thus, once the UE is powered ON/enters in to the out-of coverage state, the UE can apply the received session parameters and initiate/continue with the session (e.g., 3GPP session), thus circumventing the scanning procedure, resulting in a good user experience and seamless session experience.

Accordingly embodiments herein provide a method and system for managing at least one session across multiple electronic devices in a network system. The method includes: sending by a source electronic device a first message including a request to transfer context associated with at least one ongoing session to a target electronic device, receiving by the source electronic device a response message which includes a confirmation for the context transfer from the target electronic device, generating by the source electronic device Carry Your Own Context (CYOC) container associated with the at least one ongoing session on the source electronic device, wherein the CYOC container consists of cellular parameter information required for seamless session transfer from the source device to the target device, and transmitting by the source electronic device the CYOC container to the target electronic device.

Unlike conventional systems and methods, the proposed method allows the user to enable sessions to flow across multiple UEs via Carry Your Own Context (CYOC) container. The proposed method allows the UE a complete and seamless context transfer across multiple UEs.

Referring now to the drawings, and more particularly to FIGS. 1 through 13, these are shown preferred embodiments.

FIG. 1 illustrates a system 100 for managing sessions between a source electronic device 110 and a target electronic device 120, according to an embodiment as disclosed herein.

Referring to the FIG. 1, the system 100 includes the source electronic device 110 communicating with the target electronic device 120 through wireless connectivity. The one or more wireless connectivity include, for e.g., 3GPP D2D, and non 3GPP short range wireless link (e.g., Bluetooth, Wi-Fi, IR, etc.). For e.g., the source electronic device 110 may communicate a first message associated with the at least one ongoing session on the source UE 110 with the target electronic device 120. The first message can include, for e.g., cellular parameters associated with the at least one ongoing session on the source UE 110.

The source electronic device 110 and the target electronic device 120 can include, for e.g., Mobile Station (MS), a data processing device, electronic device, a Personal Computer (PC), a laptop computer, a mobile device, a smart phone, a Personal Digital Assistance (PDA), wearable devices, smart TV's, Internet of Things (IoT) device, electronic circuit, chipset, and electrical circuit (i.e., System on Chip (SoC)) configured to perform the proposed method, etc. In another embodiment, the source electronic device 110 and the target electronic device 120 may be associated with a capability to perform the 3GPP network procedure, modem associate to perform the 3GPP network procedure, modem associate to perform network procedure, or the like.

Further, the source electronic device 110 and the target electronic device 120 may be configured with one or more subscriptions associated with one or more network operators for providing communication services. For example, each subscription may be associated with its own identity module, such as a SIM, UICC, etc. The communication services may include, for e.g., data services, call services, etc. In an embodiment, the source electronic device 110 and the target electronic device 120 are configured to operate with same subscriptions.

Consider a scenario in which the target electronic device loops back from an offline state, then the target electronic device may require substantial amount of time to camp on to the network/to get the network bearer connected.

Unlike to the conventional mechanism, where the target electronic device consumes substantial amount of time to camp on to the network/to get the network bearer connected, the proposed method allows the source UE 110 to share the CYOC container by which the target electronic device 120 can apply the CYOC container and therefore optimize the time required to camp on to the network/to get the network bearer connected.

Unlike to the conventional mechanism, the proposed method allows the target electronic device 120 to circumvent the cell search procedure in order to establish the session and can initiate/continue, dynamically from the instant of enabling the airplane mode, out-of network coverage session, idle session of the target UE 120, the session seamlessly by locally applying the CYOC container received from the source electronic device 110. The communication of the CYOC container is detailed in conjunction with FIG. 2.

Figure 2:
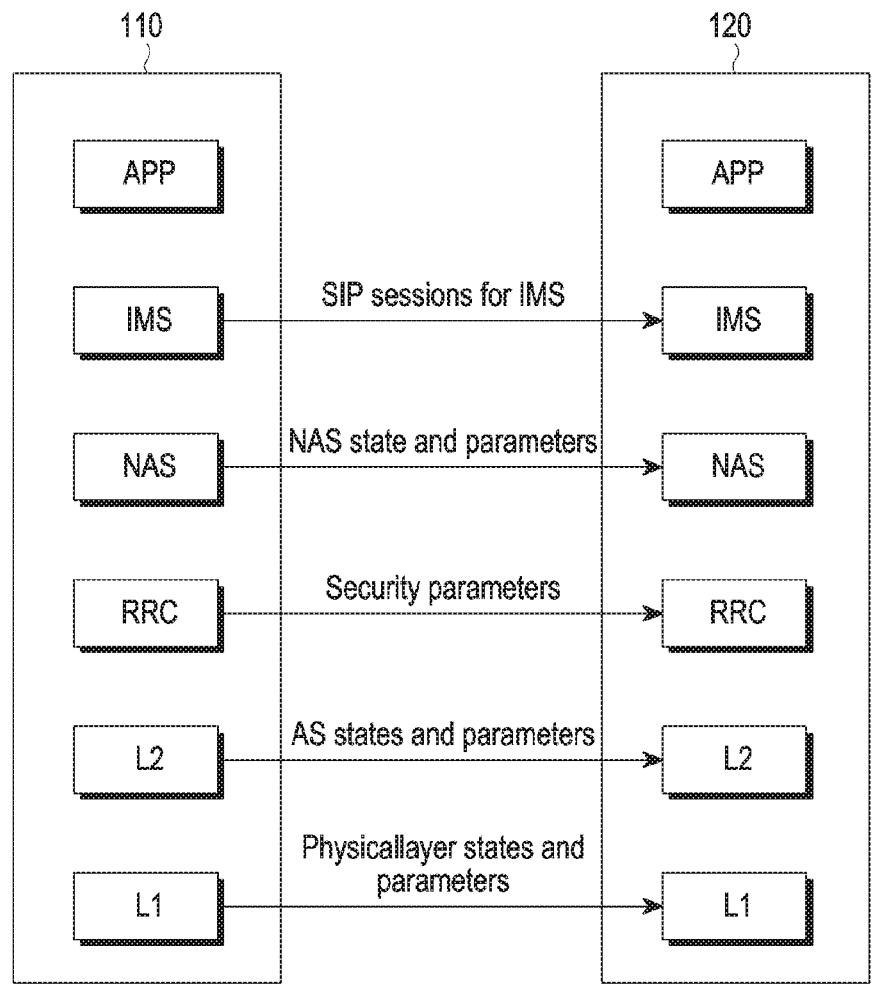
FIG. 2 illustrates various protocol stack layers communication between a source electronic device and a target electronic device for managing at least session, according to an embodiment as disclosed herein.

FIG. 2 illustrates various protocol stack layers communication between the source electronic device 110 and the target electronic device 120 for managing at least session, according to an embodiment as disclosed herein.

Referring to the FIG. 2, each of the source electronic device 110 and the target electronic device 120 includes a protocol stack layers associated therewith. The protocol stack layers includes, for e.g., application (APP) layer, IMS layer, NAS, RRC, L2 (MAC), L1 (physical layer (PHY)). Each of these protocol layers includes a session information. The session can be, for e.g., out-of network coverage session, idle session, and connected session.

In an embodiment, for example, consider the target electronic device 110 in an offline state and the source electronic device 110 request to sends the first message associated with the one or more sessions (ongoing session on the source electronic device 110) to the target electronic device 120.

The session information associated with the out-of-network coverage session may include, for e.g., Cell Search/Camping related status for each supported Radio Access Technology (RAT), List of frequencies already searched, Detected Cells for each of the frequency, Registration status for each of the cell (as available) and public land mobile networks (PLMNs), Barred List for each cell frequency, and any other information at PHY, RRC, MAC/RLC/PDCP, NAS which could aid the coverage related search if the source UE 110 had to restart the scanning after the deep implementation.

The session information associated with the idle session of the may include, for e.g., all of the session information associated with the Out of coverage session state, registration information, security keys and related NAS entities for active RAT, Measurement Database for several supported RATs, cell specific data base, frequency data base, barred list, allowed list., etc., any other information at Physical Layer, RRC, MAC/RLC/PDCP, NAS which is required if the source UE 120 had to wake up from a sleep operation and resume 3GPP related procedures at PHY, RRC, MAC/RLC/PDCP, NAS, etc.

The session information associated with the connected session may include, for e.g., all of the session information associated with the idle session, physical channel, transport channel, logical channel related configuration, states and sub state related variables required for data session, any other information at Physical Layer, RRC, MAC/RLC/PDCP, NAS which is required if the source UE 110 had to wake up from a connected sleep operation and resume 3GPP related procedures at Physical Layer, RRC, MAC/RLC/PDCP, NAS. Further, the connected session may include a SIP signaling information and information about the active VOLTE/IMS sessions on the source electronic device 110.

The source electronic device 110 can be configured to generate the CYOC container including the aforementioned session information associated with the one or more sessions. Further, the source electronic device 110 can be configured to send (i.e., through the protocol stack layer of the source electronic device 110) the generated CYOC container to the target electronic device 120.

The target UE 102 can be configured to: receive i.e., to the protocol stack layer of the target electronic device 120) the CYOC container from the source electronic device 110, and locally apply the CYOC container to initiate/continue/complete the session with the network.

Unlike to the conventional mechanism, the proposed method may allow pausing (for a pre-defined time, needy basis) the current procedure of the one or more sessions executing at each protocol stack layer of the source UE 110, and may resume the one or more sessions (from the same state as paused at the source UE 110) at the target UE 120.

Unlike to the conventional mechanism, the proposed method is built upon the Multi SIM or subscription credentials for sharing/cloning of SIM/UICC.

Unlike to the conventional mechanism, where the session transfer may require the application (APP) layer awareness for which both the source electronic device and the target electronic device are always connected to the network (e.g., Wi-Fi network), the proposed method therefore allows the source electronic device 110 to transfer the context (session information) to the target electronic device 120 on a needy basis (i.e., the target electronic device 120 in offline state without requiring it to be constantly connected to the network (e.g., 3GPP network). Thus, reducing the higher consumption of the resources at both the source electronic device 110 and target electronic device 110.

Figure 3:
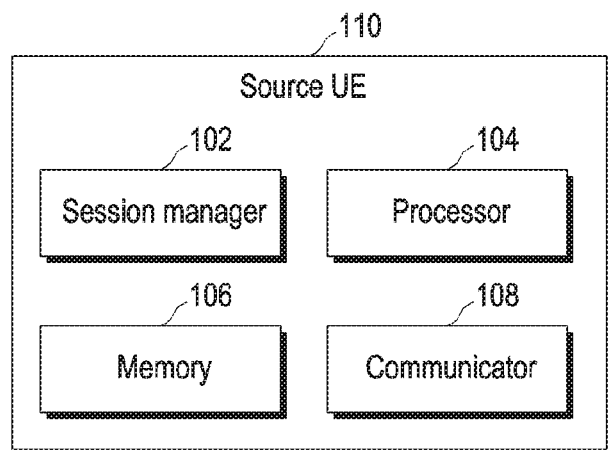
FIG. 3 illustrates various units of a source electronic device for managing a session across multiple electronic devices in a network system, according to an embodiment as disclosed herein.

FIG. 3 illustrates various units of the source electronic device 110 for managing the session across multiple electronic devices in a network system, according to an embodiment as disclosed herein.

The source electronic device 110 includes a session manager 102, a processor 104 (for example; a hardware unit, an apparatus, a Central Processing Unit (CPU), a Graphics Processing Unit (GPU), etc.,) communicatively coupled to a memory 106 (e.g., a volatile memory and/or a non-volatile memory); the memory unit 106 includes storage locations configured to be addressable through the processor 104. Further, the source electronic device 110 includes a communicator 108 coupled to the session manager 102. The session manager 102 is further coupled to the processor 104 and is configured to send the first message including the request to transfer context associated with the t least one ongoing session on the source electronic device 110 to the target electronic device 120.

The session manager 102 communicates with the target electronic device 120 through one or more wired/wireless connectivity (e.g., Bluetooth, Wi-Fi, 3GPP D2D, Wi-Fi direct, IR, or the like).

The first message may include, for e.g., one or more network credentials/session parameters (i.e., cellular parameters) defining session information associated with at least one session of the source electronic device 110. The session parameters can include, for e.g., PDCP: Re transmission buffer, SN of last ACK PDU, PDU SN for downlink received successively, Cell info: Detected Set, Measured Set, timing and acquisition details. System information's blocks, Security: Security keys for NAS and AS (RRC), NAS: ATTACH registration, APN info, PDN type, PDN type, tracking area details, Others: C-RNTI, SPS, RLC: RLC states variable for Tx and RX, Retransmission buffers., RLC window size, RRC: complete Radio bearers and signaling connections and bearers establishments, MAC: HARQ retransmission buffers and per process NACK and RV info, TCP: re-transmission buffer, SN of last ACK packet, RTT window size, IMS: Registration dB, Media DB, Session DB, etc.

Further, the session manager 102 can be configured to receive the a response message from the target electronic device 120. The response message may include one of deny message for the device context transfer request, and accept (confirmation) message for the device context request.

Further, the session manager 102 can be configured to generate the Carry Your Own Context (CYOC) container associated with the at least one ongoing session on the source electronic device 110, wherein the CYOC container consists of the cellular parameter information required for seamless session transfer from the source electronic device 110 to the target electronic device 120. The cellular parameter can include, for e.g., stack of all the session information of the at least one session associated with the source electronic device 110, one or more session specific information, or the like. The one or more session specific information comprises at least one of PDCP information, Cell information, security keys information, NAS information, RLC information, RRC information, MAC information, TCP information, and IMS information.

Furthermore, the session manager 102 can be configured to transmit the CYOC container to the target electronic device 102. For example, the target electronic device 120 can be in offline state.

Unlike conventional mechanism, where both the source device and the target electronic device are always in connected state (connected to wireless network) for transferring the content there between, the proposed session manager 102 can be configured to share the CYOC container even when the target electronic device 120 is in the offline state.

The session manager 102 can be configured to locally release RRC connection after transmitting the CYOC container to the target device 120.

The session manager 102 is configured to send the device context transfer request message to the target electronic device 120 either during deep sleep, DRX or connected DRX period respectively in out of coverage, idle and connected scenarios.

The FIG. 3 shows exemplary units of the source electronic device 110 but it is to be understood that other embodiments are not limited thereon. In other embodiments, the source electronic device 110 may include less or more number of units. Further, the labels or names of the units are used only for illustrative purpose and does not limit the scope of the invention. One or more units can be combined together to perform same or substantially similar function in the source electronic device 110.

Figure 4:
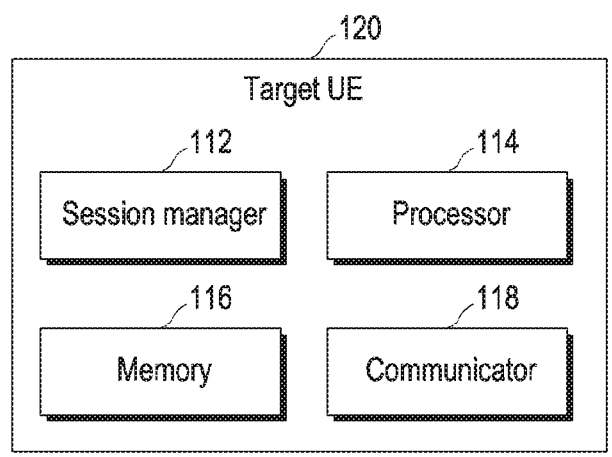
FIG. 4 illustrates various units of a target electronic device for managing a session across multiple electronic devices in a network system, according to an embodiment as disclosed herein.

FIG. 4 illustrates various units of the target electronic device 120 for managing the session across multiple electronic devices in a network system, according to an embodiment as disclosed herein.

The target electronic device 120 includes a session manager 112, a processor 114 (for example; a hardware unit, an apparatus, a Central Processing Unit (CPU), a Graphics Processing Unit (GPU), etc.,) communicatively coupled to a memory 116 (e.g., a volatile memory and/or a non-volatile memory); the memory unit 106 includes storage locations configured to be addressable through the processor 114. Further, the target electronic device 120 includes a communicator 118 coupled to the session manager 112. The session manager 112 is further coupled to the processor 114 and is configured to receive the device context transfer request message associated with the at least one session by the source electronic device 110.

The session manager 112 communicates with the source electronic device 110 through one or more wired/wireless connectivity (e.g., Bluetooth, Wi-Fi, 3GPP D2D, Wi-Fi direct, IR, or the like).

Further, the session manager 112 can be configured to a first message including a request to transfer context associated with the at least one ongoing session on the source electronic device 110.

Further, the session manager 112 can be configured to send the response message indicating a confirmation for the context transfer to the source electronic device 110.

Further, the session manager 112 can be configured to receive a Carry Your Own Context (CYOC) container associated with the at least one ongoing session on the source electronic device 110, wherein the CYOC container consists of cellular parameter information required for seamless session transfer from the source device to the target electronic device 120.

Furthermore, the session manager 112 can be configured to complete the at least one session transfer using the cellular parameters received in the CYOC container.

Once the session manager 112 applies the CYOC container, the session manager can be configured to continue one of a system acquisition and idle mode procedure, and sends the CYOC container confirmation message to the source electronic device 110.

Thus, the session manager 112 can be configured to perform the implicit handover in which the session information associated with the CYOC container received from the session manager 102 is applied by the session manager 112. Thus, a session information associated with one or more sessions of the target electronic device 120 can be superimposed by the CYOC container aiding the better user experience for the user of the target electronic device 120.

The better user experience when compared to the conventional scenarios; where the target electronic device may await the await the user to end the session on source UE and start a new session on Target UE, the proposed session manager 112 can perform the implicit handover in which the serving cell of the source electronic device 110 can be transferred to the target electronic device 120 with notifying the network.

The session manager 112 can be further configured to resume one of uplink transmission and downlink transmission of the device context depending on the capabilities of the source UE 110 and target UE 120. Furthermore, the session manager 112 can be configured to send a CYOC container confirmation message to the source electronic device 110, and triggering a radio bearer reconfiguration procedure. Yet further, the session manager 112 can be configured to trigger the RRC connection release procedure, establish the RRC connection with the network, and send the CYOC container confirmation message to the source electronic device 110.

The FIG. 4 shows exemplary units of the target electronic device 120 but it is to be understood that other embodiments are not limited thereon. In other embodiments, the target electronic device 120 may include less or more number of units. Further, the labels or names of the units are used only for illustrative purpose and does not limit the scope of the invention. One or more units can be combined together to perform same or substantially similar function in the target electronic device 120.

Figure 5:
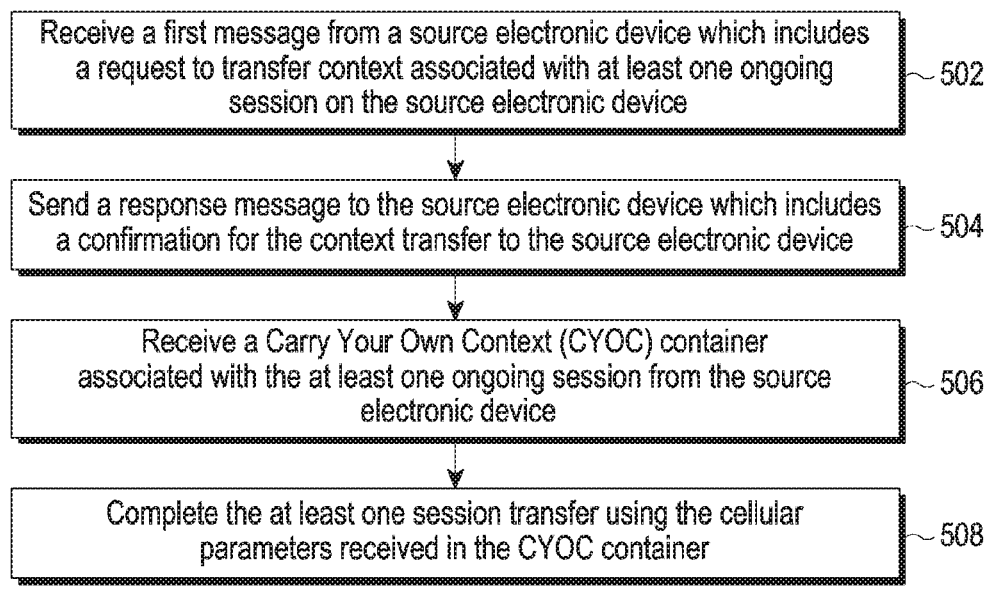
FIG. 5 is a flow diagram illustrating a method for managing a CYOC container by a target electronic device, according to an embodiment as disclosed herein.

FIG. 5 is a flow diagram illustrating a method for managing the CYOC container by the target electronic device 120, according to an embodiment as disclosed herein.

Referring to the FIG. 5, at step 502, the target electronic device 120 receives the first message including the request to transfer context associated with at least one ongoing session on the source electronic device 110. For example, in the target electronic device 120 as illustrated in the FIG. 4, the session manager 112 can be configured to receive the first message including the request to transfer context associated with at least one ongoing session on the source electronic device 110.

At step 504, the target electronic device 120 sends the response message indicating the confirmation for the context transfer to the source electronic device 110. For example, in the target electronic device 120 as illustrated in the FIG. 4, the session manager 112 can be configured to send the response message indicating the confirmation for the context transfer to the source electronic device 110.

At step 506, the target electronic device 120 receives the CYOC container associated with the at least one ongoing session on the source electronic device, wherein the CYOC container consists of cellular parameter information required for seamless session transfer from the source electronic device 120 to the target electronic device 120. For example, in the target electronic device 120 as illustrated in the FIG. 4, the session manager 112 can be configured to receive the CYOC container associated with the at least one ongoing session on the source electronic device, wherein the CYOC container consists of cellular parameter information required for seamless session transfer from the source electronic device 110 to the target electronic device 120.

At step 508, the target electronic device 120 completes the at least one session transfer using the cellular parameters received in the CYOC container. For example, in the target electronic device 120 as illustrated in the FIG. 4, the session manager 112 can be configured to complete the at least one session transfer using the cellular parameters received in the CYOC container.

The various actions, acts, blocks, steps, etc., as illustrated in the FIG. 5 may be performed in the order presented, in a different order, or simultaneously. Further, in some embodiments, some of the actions, acts, blocks, steps, etc., may be omitted, added, modified, skipped, etc., without departing from the scope of the disclosure.

Figure 6:
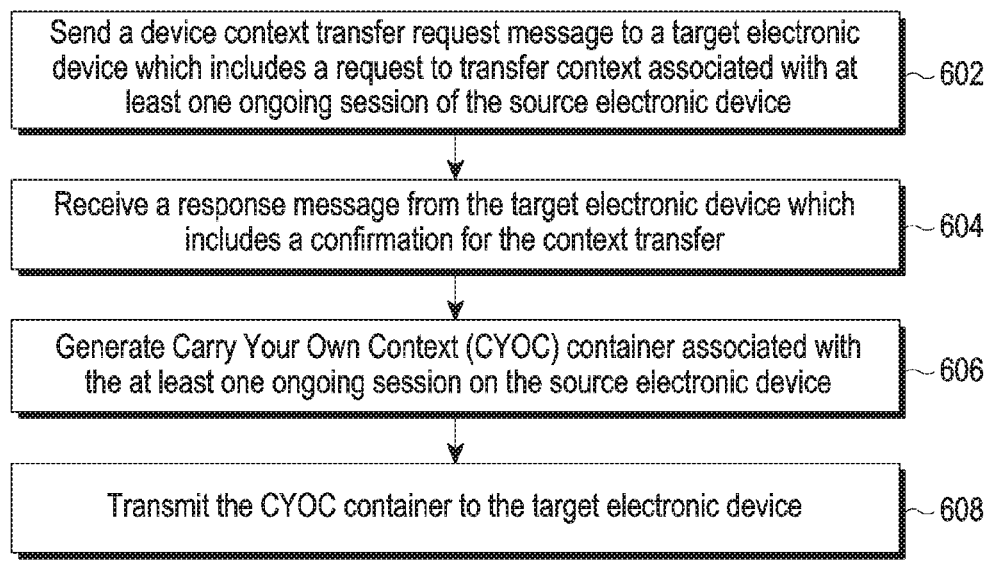
FIG. 6 is a flow diagram illustrating for managing a CYOC container by a source electronic device, according to an embodiment as disclosed herein.

FIG. 6 is a flow diagram illustrating for managing the CYOC container by the source electronic device 110, according to an embodiment as disclosed herein.

Referring to the FIG. 6, at step 602, the source electronic device 110 sends first message including the request to transfer context associated with the at least one ongoing session to the target electronic device 120. For example, in the source electronic device 120 as illustrated in the FIG. 3, the session manager 102 can be configured to send the first message including the request to transfer context associated with the at least one ongoing session to the target electronic device 120.

At step 604, the source electronic device 110 receives the response message indicating the confirmation for the context transfer from the target electronic device 120. For example, in the source electronic device 120 as illustrated in the FIG. 3, the session manager 102 can be configured to receive the response message which includes the confirmation for the context transfer from the target electronic device 120.

At step 606, the source electronic device 110 generates the CYOC container associated with the at least one ongoing session on the source electronic device 110, wherein the CYOC container consists of cellular parameter information required for seamless session transfer from the source electronic device 110 to the target electronic device 120 as illustrated in the FIG. 3, the session manager 102 can be configured to generate the CYOC container associated with the at least one ongoing session on the source electronic device 110, wherein the CYOC container consists of cellular parameter information required for seamless session transfer from the source electronic device 110 to the target electronic device 120.

At step 608, the source electronic device 110 transmits the CYOC container to the target electronic device 120. For example, in the source electronic device 120 as illustrated in the FIG. 3, the session manager 102 can be configured to transmit the CYOC container to the target electronic device 120.

The various actions, acts, blocks, steps, etc., as illustrated in the FIG. 6 may be performed in the order presented, in a different order, or simultaneously. Further, in some embodiments, some of the actions, acts, blocks, steps, etc., may be omitted, added, modified, skipped, etc., without departing from the scope of the disclosure.

As a capability associated with both the source UE 110 and the target UE 120 may be different, therefore the proposed method allows managing of the session information (downgrade and/or upgrade) based on the capability of the source UE 110 and the target UE 120 (exchanged during RRC connection procedure) respectively, as detailed in FIGS. 7-10.

Source UE 110 Session:—Idle State/Out-of Coverage

Figure 7:
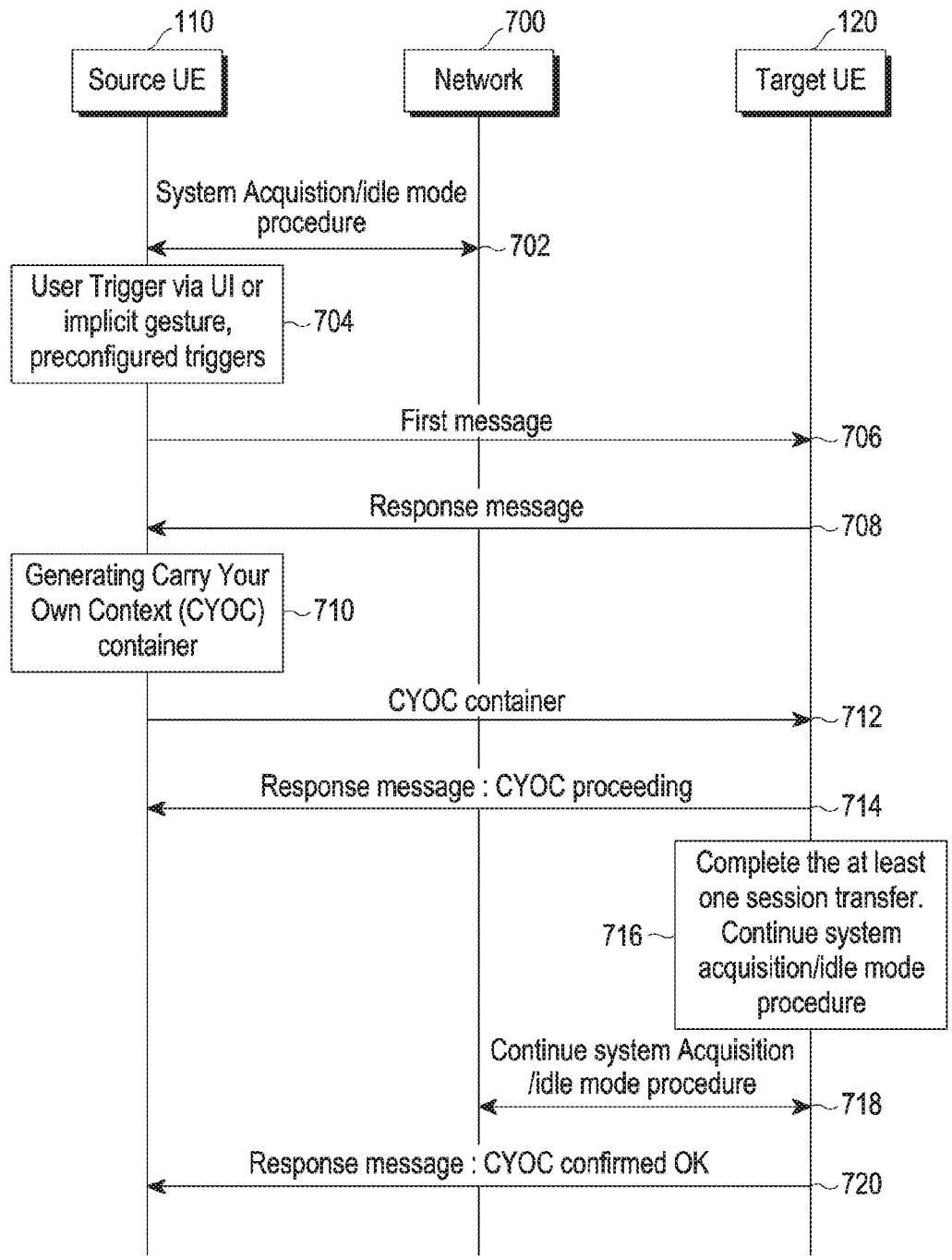
FIG. 7 is a sequence diagram illustrating various signaling messages exchanged between a source UE and a target UE for transferring CYOC container during an idle/out-of-coverage session, according to an embodiment as disclosed herein.

The FIG. 7 is a sequence diagram illustrating various signaling messages exchanged between the source UE 110 and the target UE 120 for transferring the CYOC container during the idle/out-of-coverage session, according to an embodiment as disclosed herein.

Initially, the source UE 110 can be configured to establish (702) a system acquisition and idle mode procedure with a core network 700 (i.e., 3GPP network operator). The source UE 110 can communicate with the network on needy basis (i.e., when the user of the source UE desires to switch the session in one or more scenarios such as, for e.g., out-of coverage, low battery, etc.). The source UE 110 can be configured to detect an input on to a display (e.g., a Cathode Ray Tube (CRT) display, a Liquid Crystal Display (LCD), Organic Light-Emitting Diode (OLED), a Light-emitting diode (LED), User Interface (UI) etc.,) being interfaced with a processor 104 to communicate with the target UE. The input may include, for e.g., touch, swipe, multiple gesture, preconfigured gestures, etc. Thus, the source UE 110 triggers (704) the input provided.

Further, in response message to the input provided, the source UE 110 can be configured to send (706) the first message to the target UE 120. The target UE 120 can receive the first message from the source UE 110 and can decode the information associated therewith. The target UE 120, post decoding the information, can send (708) the response message to the source UE 110. The source UE 110, upon receipt of the response message, can decode the information associated with the device context transfer response message and locally generate (710) the CYOC container associated with the at least one ongoing session on the source UE 110, wherein the CYOC container consists of cellular parameter information required for seamless session transfer from the source UE 110 to the target UE 120. The cellular parameter includes all the session parameters/session information associated with the idle state session of the source UE 110. For e.g., cell information, Tx/Rx channel, etc.

The source UE 110 can send (712) the generated CYOC container to the target UE 120. The target UE 120 process the CYOC container and send (714) the CYOC container process response message to the source UE 110, notifying the status of the CYOC container. The target UE 120 can be therefore complete (716) the at least session transfer by using the cellular parameter information from the CYOC container in to its respective state machine of every protocol stack layer (i.e., depending on sate the source UE 110 has transferred the session). Thus, the target UE 120 can continue establishing (718) the system acquisition/idle procedure with the network 700.

Furthermore, the target UE 120 can send (720) a confirmation message notifying the source UE 110 that the CYOC container is locally applied and switch over is confirmed.

Source UE 110 Session:—Connected State

Figure 8:
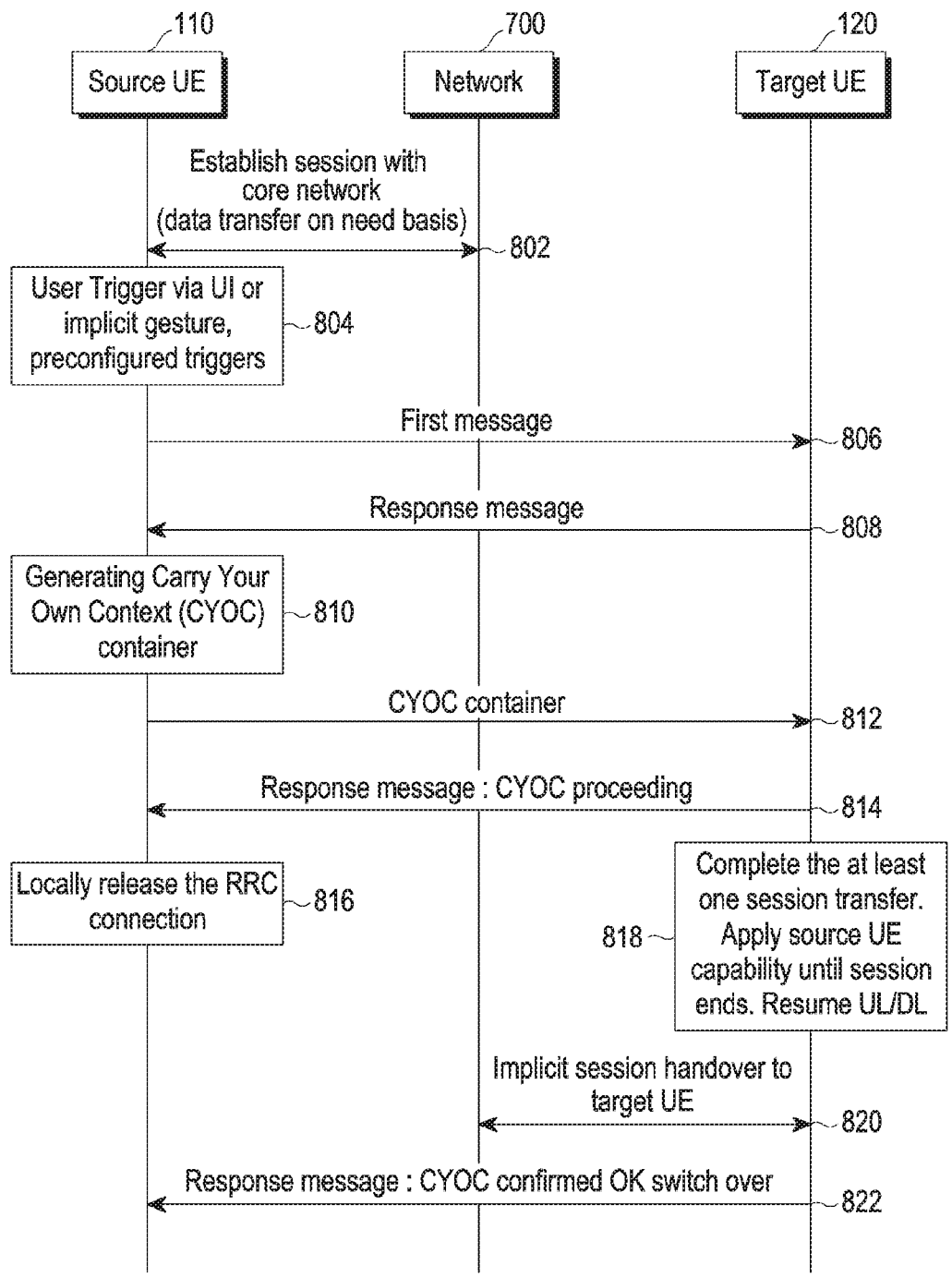
FIG. 8 is a sequence diagram illustrating various signaling messages exchanged between a source UE and a target UE for transferring CYOC container during a connected session, according to an embodiment as disclosed herein.

FIG. 8 is a sequence diagram illustrating various signaling messages between the source UE 110, network 700 and the target UE 120 for managing session, when the source UE 110 is in connected state session, according to an embodiment as disclosed herein.

Considering that the capability of the target UE 120 is greater or equal to the capability of the source UE 110.

Initially, the source UE 110 can be configured to establish (802) a session with a core network 700 (i.e., 3GPP network operator). The source UE 110 can communicate with the network for transferring the context on a needy basis. The source UE 110 can be configured to detect an input on to a display (e.g., a Cathode Ray Tube (CRT) display, a Liquid Crystal Display (LCD), Organic Light-Emitting Diode (OLED), a Light-emitting diode (LED), User Interface (UI) etc.,) being interfaced with a processor 104 to communicate with the target UE. The input may include, for e.g., touch, swipe, multiple gesture, pre-configured gestures, etc. Thus, the source UE 110 triggers (804) the input provided.

Further, in response to the input, the source UE 110 can be configured to send (806) the first message to the target UE 120. The target UE 120 can receive the device for context transfer request message from the source UE 110 and can decode the information associated therewith. The target UE 120, post decoding the information, can send (808) the response to the first message to the source UE 110. The source UE 110, upon receipt of the first message, can decode the information associated with the device context transfer response message and locally generate (810) the CYOC container including the cellular parameters. The cellular parameters includes all the session parameters/session information associated with the connected state session of the source UE 110.

The source UE 110 can send (812) the generated CYOC container to the target UE 120. The target UE 120 process the CYOC container and send (814) a CYOC container process response message to the source UE 110, notifying the status of the CYOC container. Further, the source UE 110 can be configured to locally release (816) (without notifying to the network 700) the RRC connection associated with the source UE 110. The target UE 120 can be therefore complete (818) the session transfer by locally applying the session information from the CYOC container in to its respective state machine of every protocol stack layer (i.e., depending on state the source UE 110 has transferred the session). Thus, the target UE 120 can resume UL/DL of the resources with the network 700.

Thus, the target UE 120 can be configured to perform (820) the implicit handover, and send (822) a confirmation message notifying the source UE 110 that the CYOC container is locally applied and switch over is succeeded.

The above sequence of steps illustrated in the FIG. 8 may be performed in the order presented, in a different order, or simultaneously. Further, in some embodiments, some of the actions, signaling messages, etc., may be omitted, added, modified, skipped, altered, etc., without departing from the scope of the disclosure. For example, in another embodiment, the source UE 110 can locally release the RRC message even before receiving the CYOC container process response message (i.e., CYOC container confirmation message).

Figure 9:
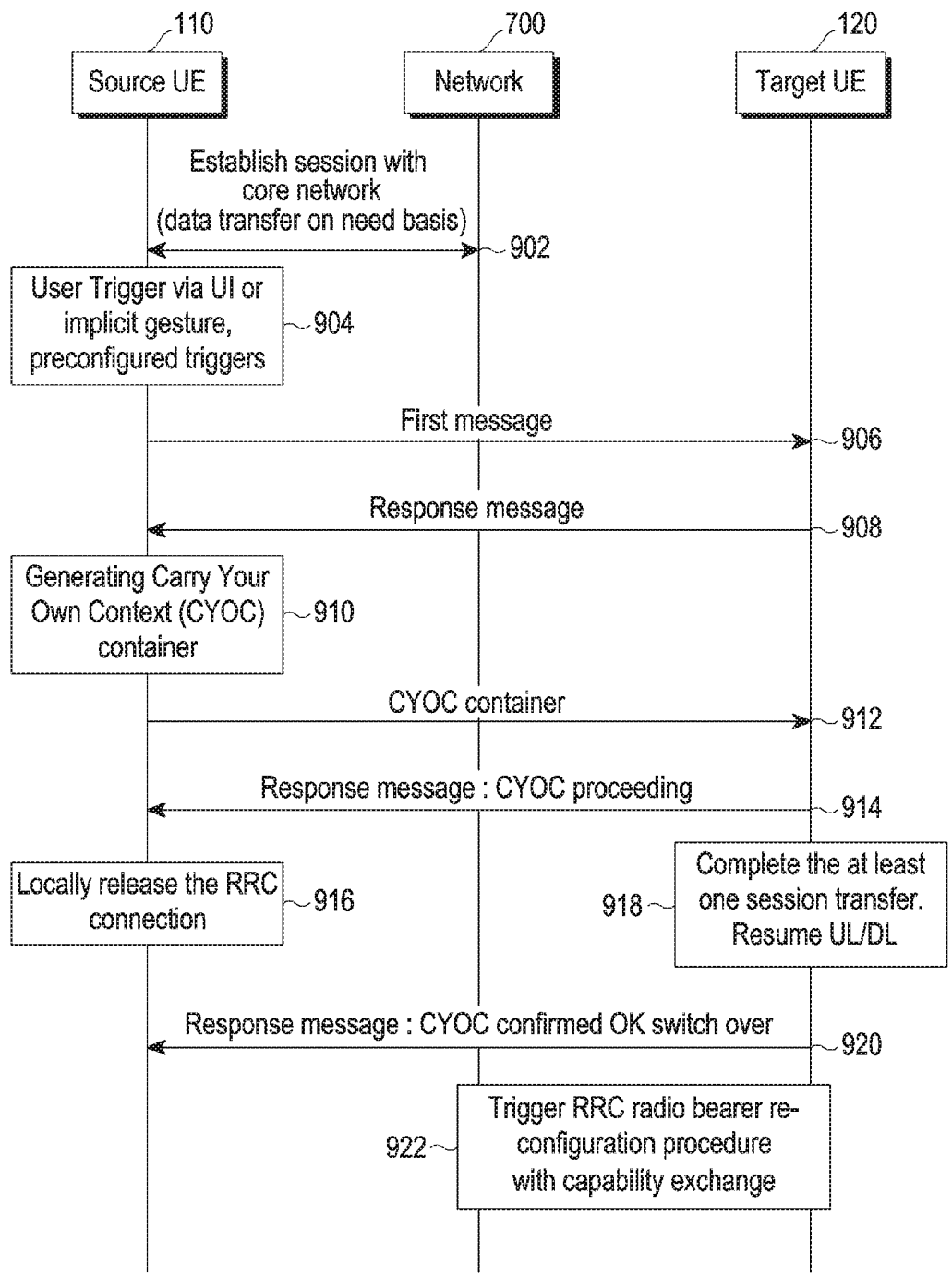
FIG. 9 is a sequence diagram illustrating various signaling messages exchanged between a source UE and a target UE for transferring CYOC container during a connected session with improved Quality of service (QoS), according to an embodiment as disclosed herein.

FIG. 9 is a sequence diagram various signaling messages exchanged between the source UE 110 and the target UE 120 for transferring the CYOC container during the connected session with improved Quality of service (QoS), according to an embodiment as disclosed herein.

Considering that the capability of the target UE 120 is greater or equal to the capability of the source UE 110.

The signaling messages (902-918) are identical to that of the signaling messages (802-818) of the FIG. 8.

The target UE 120 can send (920) a confirmation message notifying the source UE 110 that the CYOC container is locally applied and switch over is succeeded. Further, to have better QoS, the target UE 120 can trigger (920) a RRC radio bearer Reconfiguration procedure. In another embodiment, the network 700/target UE 120 can trigger (922) authentication procedure.

Figure 10:
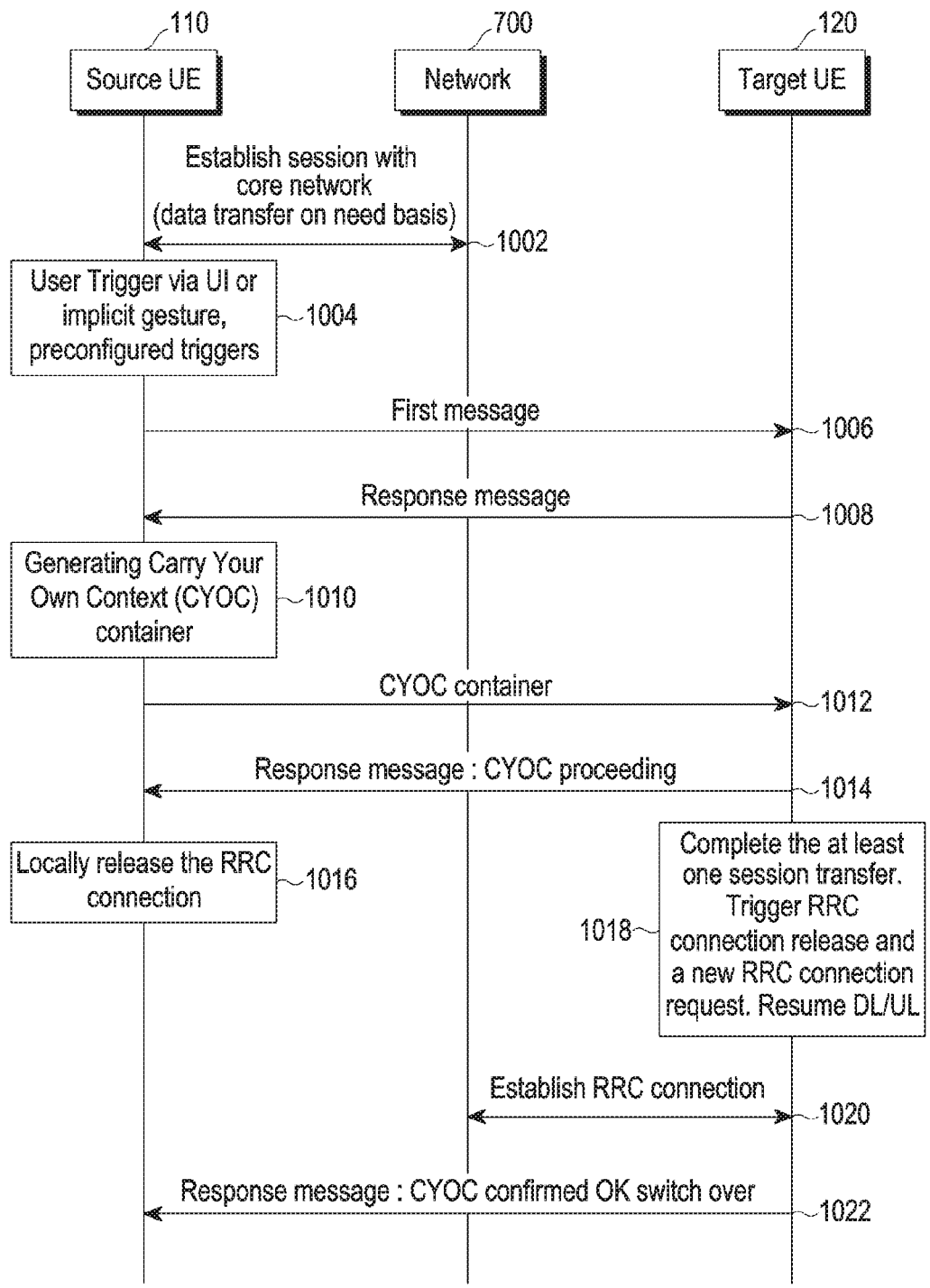
FIG. 10 is sequence diagram illustrating various signaling messages exchanged between a source UE and a target UE for transferring CYOC container during a connected session with capability less than the target UE, according to an embodiment as disclosed herein.

FIG. 10 is sequence diagram illustrating various signaling messages exchanged between the source UE 110 and the target UE 120 for transferring the CYOC container during the connected session with capability less than the target UE 120, according to an embodiment as disclosed herein.

Initially, the source UE 110 can be configured to establish (1002) a session with a core network 700 (i.e., 3GPP network operator). The source UE 110 can communicate with the network for transferring the context on a needy basis.

The source UE 110 can be configured to detect an input on to a display (e.g., a Cathode Ray Tube (CRT) display, a Liquid Crystal Display (LCD), Organic Light-Emitting Diode (OLED), a Light-emitting diode (LED), User Interface (UI) etc.,) being interfaced with a processor 104 to communicate with the target UE. The input may include, for e.g., touch, swipe, multiple gesture, pre-configured gestures, etc. Thus, the source UE 110 triggers (1004) the input provided.

Further, in response to the input, the source UE 110 can be configured to send (1006) the first message to the target UE 120. The target UE 120 can receive the first message from the source UE 110 and can decode the information associated therewith. The target UE 120, post decoding the information, can send (1008) the response message to the source UE 110. The source UE 110, upon receipt of the first message, can decode the information associated with the device context transfer response message and locally generate (1010) the CYOC container including the cellular parameters. The CYOC container includes all the session parameters/session information associated with the connected state session of the source UE 110.

The source UE 110 can send (1012) the generated CYOC container to the target UE 120. The target UE 120 process the CYOC container and send (1014) a CYOC container process response message to the source UE 110, notifying the status of the CYOC container. Further, the source UE 110 can be configured to locally release (1016) (without notifying to the network 700) the RRC connection associated with the source UE 110. The target UE 120 can be therefore complete (1018) the at least one session transfer using the session information from the CYOC container in to its respective state machine of every protocol stack layer (i.e., depending on sate the source UE 110 has transferred the session). Thus, the target UE 120 can resume UL/DL of the resources with the network 700. Further, the target UE 120 can be configured to trigger a RRC connection release and a new RRC connection request is triggered.

The target UE 120 can be configured to establish (1020) the RRC connection with the network 700, and send (1022) a confirmation message notifying the source UE 110 that the CYOC container is locally applied and switch over is confirmed.

The above sequence of steps illustrated in the FIG. 10 may be performed in the order presented, in a different order, or simultaneously. Further, in some embodiments, some of the actions, signaling messages, etc., may be omitted, added, modified, skipped, altered, etc., without departing from the scope of the disclosure. For example, in another embodiment, the source UE 110 can locally release the RRC message even before receiving the CYOC container process response message (i.e., CYOC container confirmation message).

Figure 11:
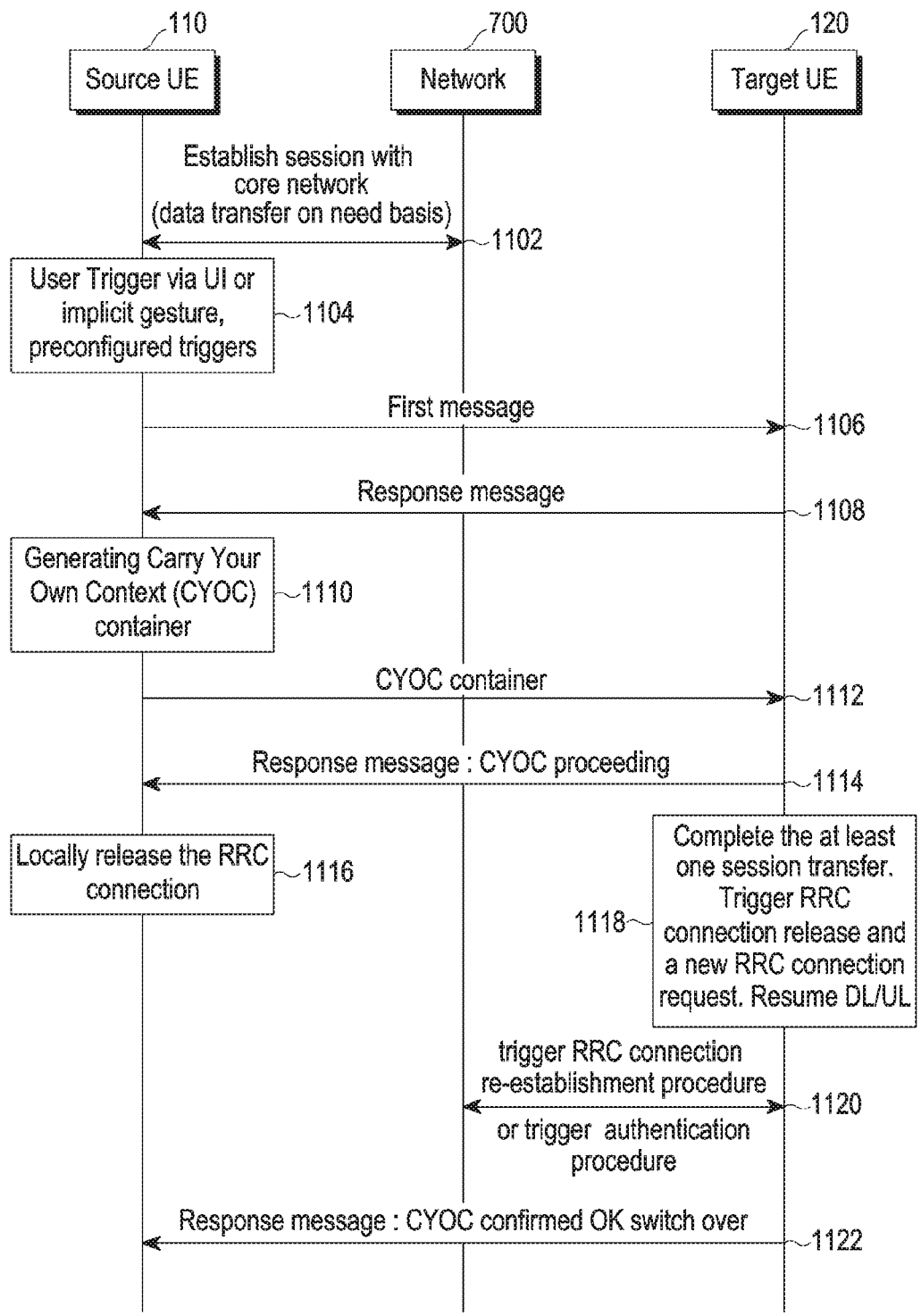
FIG. 11 is sequence diagram illustrating various signaling messages exchanged between a source UE and a target UE for transferring CYOC container with improved QoS, according to an embodiment as disclosed herein.

FIG. 11 is a sequence diagram illustrating various signaling messages exchanged between the source UE 110 and the target UE 120 for transferring CYOC container with improved QoS, according to an embodiment as disclosed herein.

The signaling messages (1102-1118) are identical to that of the signaling messages (1002-1018) of the FIG. 10.

The target UE 120 can trigger (1120) a RRC connection re-establishment procedure.

In another embodiment, the network 700/target UE 120 can trigger (1120) authentication procedure. Further, the target UE 120 can send (1122) a confirmation message notifying the source UE 110 that the CYOC container is locally applied and switch over is succeeded.

Figure 12:
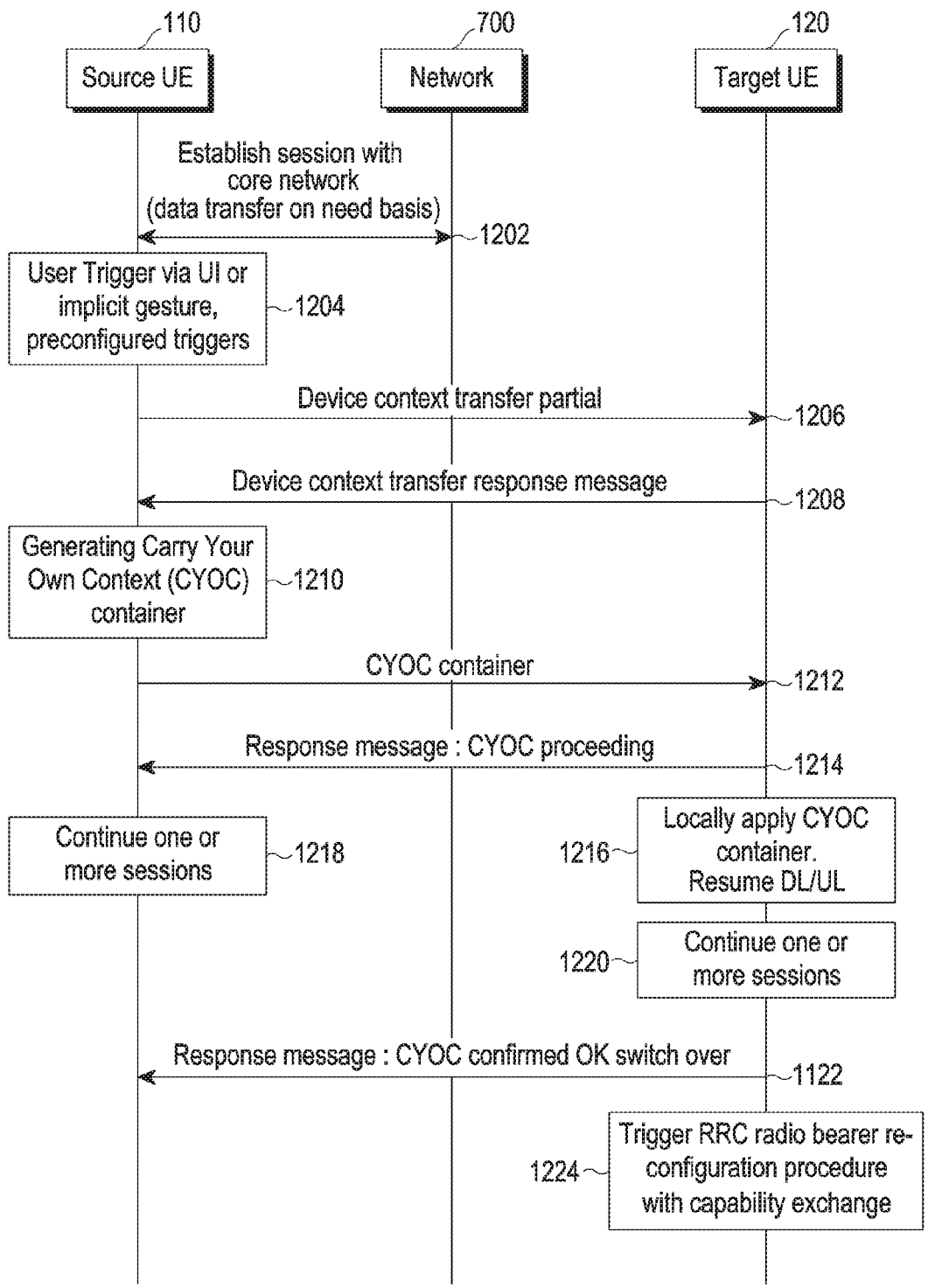
FIG. 12 is sequence diagram illustrating various signaling messages exchanged between a source UE and a target UE for transferring a partial CYOC container during a connected session, according to an embodiment as disclosed herein.

FIG. 12 is sequence diagram illustrating various signaling messages exchanged between the source UE 110 and the target UE 120 for transferring a partial CYOC container during the connected session, according to an embodiment as disclosed herein.

Referring to the FIG. 12, the proposed method allows the network operator provisioning for managing multiple UEs to be active simultaneously even though they share the same subscription.

Initially, the source UE 110 can be configured to establish (1202) a session with a core network 700 (i.e., 3GPP network operator). The source UE 110 can communicate with the network 700 for transferring the context on a needy basis.

The source UE 110 can be configured to detect an input on to a display (not shown) to communicate with the target UE 120. The display can be, for e.g., a Cathode Ray Tube (CRT) display, a Liquid Crystal Display (LCD), Organic Light-Emitting Diode (OLED), a Light-emitting diode (LED), User Interface (UI) etc., being interfaced with a processor 104. The input may include, for e.g., touch, swipe, multiple gesture, preconfigured gestures, etc. Thus, the source UE 110 triggers (1204) the input provided.

Further, the source UE 110 can be configured to send (1206) the device for context transfer (partial) request message to the target UE 120. The target UE 120 can receive the device for context transfer (partial) request message from the source UE 110 and can decode the information associated therewith. The target UE 120, post decoding the information, can send (1208) the device context transfer (partial) response message to the source UE 110. The source UE 110, upon receipt of the device context transfer response message, can decode the information associated with the device context transfer response message and locally generate (1210) the CYOC container (including partial context). The CYOC container includes partial session parameters/partial session information associated with the connected state session of the source UE 110.

The partial context may include, for e.g., when the Source UE 110 has several simultaneous sessions active, and the user may want only one or some of the sessions (i.e., subset of session information) to be transferred from to the target UE 120. Thus, the partial context may include the subset of session information.

The source UE 110 can send (1212) the generated CYOC container to the target UE 120. The target UE 120 process the CYOC container and send (1214) a CYOC container process response message to the source UE 110, notifying the status of the CYOC container.

The target UE 120 can be therefore locally apply (1216) the partial session information from the CYOC container in to its respective state machine of every protocol stack layer (i.e., depending on sate the source UE 110 has transferred the session). Thus, the target UE 120 can resume UL/DL of the resources with the network 700. Further, the source UE 110 can be configured to provide (1218 & 1220) a user an option to continue the one or more sessions (simultaneously on both target UE 120 and the source UE 110). Similarly, even the target UE 110 can be configured to provide a user an option to continue the one or more sessions (simultaneously on both target UE 120 and the source UE 110). Further, the target UE 120 can be configured to send (1222) a confirmation message notifying the source UE 110 that the CYOC container is locally applied and switch over is succeeded. Furthermore, to have better QoS, the target UE 120 can trigger (1224) a RRC radio bearer Re-configuration procedure. In another embodiment, the network 700/target UE 120 can trigger authentication procedure.

Unlike the conventional mechanism, the proposed method allows utilizing device capability (Higher MIMO or low power) through 3GPP standard and network support.

Figure 13:
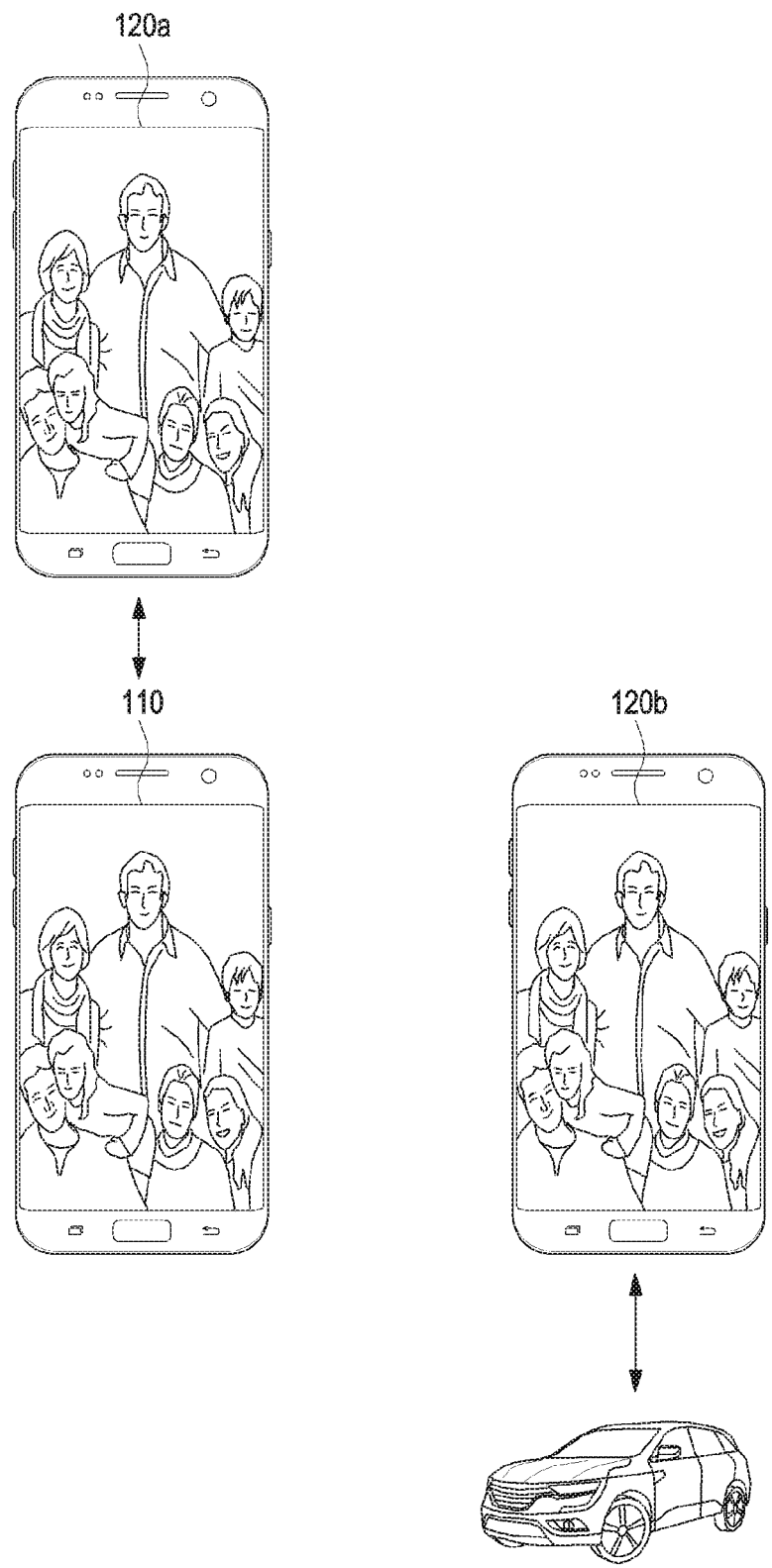
FIG. 13 is an example scenario in which user of the source UE transfers the session context to one or more target UEs, according to an embodiment as disclosed herein.

FIG. 13 is an example scenario in which the user of the source UE 110 transfers the session context to one or more target UEs 120a & 120b, according to an embodiment as disclosed herein.

When the user has a requirement of performing certain activity such as attending office meetings, or exercising or experiencing the one or more target UEs 120a and 120b which requires a UE switchover, the user wants to access the sessions on any one of the target UEs 120a and 120b seamlessly. The user does not want to have separate subscription and the user does not want manual intervention.

In order to implement user requirements, in the proposed method operator support is obtained for allowing cloning of SIM cards for one or more target UEs 120a and 120b, the target UE 120a from the one or more target UEs 120a and 120b is allowed to be active at a time and for 3GPP transfer of context between the one or more target UEs 120a and 120b is triggered by proximity between the source UE 110. In the proposed method when the user switches from the source UE 110 to one of the target UE 120a, the 3GPP specific information such as registration, authentication, security, mobility information is transferred by the source UE 110 to the target UE 120a (i.e., the target UE 120a in offline state). Cell related information, packet transmission state, feedback state, Radio bearer IDs, SIP signaling information and active VOLTE/IMS session is transferred as well.

In another embodiment, multiple electronic device (source UE 110, target UE 120a, and target UE 120b) can be online simultaneously by sharing the partial session context associated with at least one session of the source UE 110.

Unlike conventional methods, the proposed method provides value for operators by controlling and monetizing SIM cloning. The operator applies Value added Services (VAS) and monetized it.

The embodiments disclosed herein can be implemented using at least one software program running on at least one hardware device and managing at least one session across multiple electronic devices.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for managing at least one session across multiple electronic devices in a network system, the method comprises:
    receiving, by a target electronic device, a first message from a source electronic device which includes a request to transfer context associated with at least one ongoing session on the source electronic device;
    sending, by the target electronic device, a response message to the source electronic device which includes a confirmation for the context transfer;
    receiving, by the target electronic device, a Carry Your Own Context (CYOC) container associated with the at least one ongoing session from the source electronic device, wherein the CYOC container consists of cellular parameter information required for seamless session transfer from the source electronic device to the target electronic device; and
    completing, by the target electronic device, at least one session transfer using the cellular parameter information received in the CYOC container.

2. The method of claim 1, wherein the cellular parameter information comprises information related to at least one session specific information, at least one out-of-coverage session information, at least one idle session information, and at least one connected session information.

3. The method of claim 2, wherein the at least one session specific information comprises one of a packet data convergence protocol (PDCP) information, Cell information, security keys information, a Non-access stratum (NAS) information, Radio Link Control (RLC) information, Radio Resource Control (RRC) information, Medium Access Control (MAC) information, a Transmission Control Protocol (TCP) information, IP Multimedia Subsystem (IMS) information, or any combination thereof.

4. The method of claim 2, wherein the at least one out-of-coverage session Information comprises required information for the source electronic device to restart scanning after a deep sleep operation, the required information comprising cell search and camping related status for each supported Radio Access Technology (RAT), a list of frequencies already searched, detected cells for each of the frequency, registration status for each of the cell and public land mobile networks (PLMNs), a barred list for each frequency, information of at least one of a physical layer, a RRC layer, a MAC layer, a RLC layer, a PDCP layer, and a NAS layer.

5. The method of claim 2, wherein the at least one idle session information comprises required information for the source device to wake up from a DRX (discontinuous reception) sleep operation and resume 3GPP related procedures at one of physical layer, RRC layer, MAC layer, RLC layer, PDCP layer, and NAS layer, the required information comprising a registration information, security keys and related NAS entities for activating RAT, measurement database for several supported RATs, cell specific database, frequency database, barred list, allowed list, information of at least one of the physical layer, the RRC layer, the MAC layer, the RLC layer, the PDCP layer, and the NAS layer.

6. The method of claim 2, wherein the at least one connected session information comprises required information for the source electronic device to wake up from a connected DRX sleep operation and resume 3GPP related procedures at one of a physical layer, RRC layer, MAC layer, RLC layer, PDCP layer, and NAS layer, the required information comprising physical channel information, transport channel information, logical channel related configuration, states and sub-state related variables required for data at least one session, a session initiation protocol (SIP) signaling information, information about at least one active Voice over Long term evolution (VOLTE) session on the source electronic device, information about at least one active IMS session on the source electronic device, information of at least one of the physical layer, the RRC layer, the MAC layer, the RLC layer, the PDCP layer, and the NAS layer.

7. The method of claim 1, wherein the method further comprises
    continuing by the target electronic device one of system acquisition and idle mode procedure; and
    sending a CYOC confirmation message to the source electronic device.

8. The method of claim 1, wherein the method further comprises
performing, by the target electronic device, an implicit handover; and
sending a CYOC confirmation message to the source electronic device.

9. The method of claim 1, wherein the method further comprises
resuming, by the target electronic device, one of uplink transmission and downlink transmission;
sending a CYOC confirmation message to the source electronic device; and
triggering by the target electronic device a radio bearer reconfiguration procedure.

10. The method of claim 1, wherein the method further comprises
triggering a Radio Resource Control (RRC) connection release procedure;
establishing a RRC connection with the network system; and
sending a CYOC confirmation message to the source electronic device.

11. The method of claim 1, wherein the method further comprises triggering a RRC connection reestablishment procedure with the network system; and
sending a CYOC confirmation message to the source electronic device.

12. The method in claim 1, wherein the first message is received from the source electronic device in one of a deep sleep, DRX, connected DRX period respectively in out of coverage, idle and connected scenarios,
wherein the source electronic device and the target electronic device are subscribed with same Subscriber identity Module (SIM), and
wherein the target electronic device is in an offline state.

13. A method for managing at least one session across multiple electronic devices in a network system, the method comprises:
sending by a source electronic device a first message to a target electronic device which includes a request to transfer context associated with at least one ongoing session of the source electronic device;
receiving by the source electronic device a response message from the target electronic device which includes a confirmation for the context transfer;
generating by the source electronic device Carry Your Own Context (CYOC) container associated with the at least one ongoing session on the source electronic device, wherein the CYOC container consists of cellular parameter information required for seamless session transfer from the source electronic device to the target electronic device; and
transmitting by the source electronic device the CYOC container to the target electronic device.

14. The method of claim 13, wherein the cellular parameter information comprises information related to at least one session specific information, at least one out-of-coverage session information, at least one idle session Information, and at least one connected session information.

15. The method of claim 14, wherein the at least one session specific information comprises one of PDCP information, Cell information, security keys information, NAS information, RLC information, RRC information, MAC information, TCP information, IMS information, or any combination thereof.

16. The method of claim 14, wherein the at least one out-of-coverage session Information comprises required information for the source electronic device to restart scanning after a deep sleep operation, the required information comprising cell search and camping related status for each supported Radio Access Technology (RAT), a list of frequencies already searched, detected cells for each of the frequencies, registration status for each of the cell and PLMNs, a barred list for each frequency, information of at least one of a physical layer, a RRC layer, a MAC layer, a RLC layer, a PDCP layer, and a NAS layer.

17. The method of claim 14, wherein the at least one idle session information comprises required information for the source electronic device to wake up from a DRX sleep operation and resume 3GPP related procedures at one of physical layer, RRC layer, MAC layer, RLC layer, PDCP layer, and NAS layer, the required information comprising registration information, security keys and related NAS entities for active RAT, measurement database for several supported RATs, cell specific database, frequency database, barred list, allowed list, information of at least one of the physical layer, the RRC layer, the MAC layer, the RLC layer, the PDCP layer, and the NAS layer.

18. The method of claim 14, wherein the at least one connected session information comprises required information for the source electronic device to wake up from a connected DRX sleep operation and resume 3GPP related procedures at one of a physical layer, RRC layer, MAC layer, RLC layer, PDCP layer, and NAS layer, the required information comprising physical channel information, transport channel information, logical channel related configuration, states and sub-state related variables required for data at least one session, a session initiation protocol (SIP) signaling information, information about at least one active Voice over Long term evolution (VOLTS) session on the source electronic device, and information about at least one active IMS session on the source electronic device, information of at least one of the physical layer, the RRC layer, the MAC layer, the RLC layer, the PDCP layer, and the NAS layer.

19. The method in claim 13, wherein the first message is transferred in one of a deep sleep, DRX, and connected DRX period respectively in out-of-coverage session, idle session and connected session,
wherein the source electronic device locally releases a RRC connection after transmitting the CYOC container to the target electronic device,
wherein the source electronic device and the target electronic device is subscribed same Subscriber Information Module (SIM), and
wherein the target electronic device is in an offline state.

20. A target electronic device for managing at least one session across multiple electronic devices in a network system, the target electronic device comprises:
a memory;
a processor; and
a session manager, connected to the processor and the memory, configured to:
receive a first message from a source electronic device which includes a request to transfer context associated with at least one ongoing session on the source electronic device,
send a response message to the source electronic device which includes a confirmation for the context transfer to the source electronic device,
receive a Carry Your Own Context (CYOC) container associated with the at least one ongoing session from the source electronic device, wherein the CYOC container consists of cellular parameter information required for seamless session transfer from the source device to the target device; and complete the at least one session transfer using the cellular parameter information received in the CYOC container.

\* \* \* \* \*